US009065739B2

(12) United States Patent
Cheng et al.

(10) Patent No.: US 9,065,739 B2
(45) Date of Patent: Jun. 23, 2015

(54) METHOD AND APPARATUS FOR PROVIDING END-TO-END QUALITY OF SERVICE (QOS)

(75) Inventors: Mark W. Cheng, San Diego, CA (US); Liangchi Hsu, San Diego, CA (US)

(73) Assignee: Nokia Technologies Oy, Espoo (FI)

( * ) Notice: Subject to any disclaimer, the term of this patent is extended or adjusted under 35 U.S.C. 154(b) by 1419 days.

(21) Appl. No.: 11/044,892

(22) Filed: Jan. 27, 2005

(65) Prior Publication Data

US 2005/0169171 A1 Aug. 4, 2005

Related U.S. Application Data

(60) Provisional application No. 60/541,514, filed on Feb. 3, 2004.

(51) Int. Cl.
*H04L 12/801* (2013.01)
*H04L 12/851* (2013.01)
*H04L 12/825* (2013.01)
*H04L 12/841* (2013.01)
*H04W 28/16* (2009.01)
*H04W 28/18* (2009.01)
*H04W 28/24* (2009.01)

(52) U.S. Cl.
CPC ............... *H04L 47/10* (2013.01); *H04L 47/14* (2013.01); *H04L 47/18* (2013.01); *H04L 47/2425* (2013.01); *H04L 47/26* (2013.01); *H04L 47/283* (2013.01); *H04W 28/16* (2013.01); *H04W 28/18* (2013.01); *H04W 28/24* (2013.01)

(58) Field of Classification Search
USPC .......................... 370/230–234, 332–333, 444
See application file for complete search history.

(56) References Cited

U.S. PATENT DOCUMENTS

| | | | | |
|---|---|---|---|---|
| 7,023,825 | B1 * | 4/2006 | Haumont et al. | 370/338 |
| 7,043,237 | B2 * | 5/2006 | Snyder et al. | 455/425 |
| 7,224,679 | B2 * | 5/2007 | Solomon et al. | 370/338 |
| 7,289,453 | B2 * | 10/2007 | Riedel et al. | 370/252 |
| 2002/0077097 | A1 * | 6/2002 | Mizell et al. | 455/423 |
| 2003/0117964 | A1 * | 6/2003 | Chen et al. | 370/252 |
| 2003/0134655 | A1 * | 7/2003 | Chen et al. | 455/522 |
| 2003/0179726 | A1 | 9/2003 | Forssell et al. | 370/328 |
| 2004/0058652 | A1 * | 3/2004 | McGregor et al. | 455/67.13 |
| 2004/0105415 | A1 * | 6/2004 | Fujiwara et al. | 370/338 |
| 2004/0160922 | A1 * | 8/2004 | Nanda et al. | 370/335 |
| 2004/0203796 | A1 * | 10/2004 | Dunlop et al. | 455/445 |

(Continued)

FOREIGN PATENT DOCUMENTS

| | | |
|---|---|---|
| CN | 1430434 A | 7/2003 |
| KR | 2003-0047804 | 6/2003 |
| WO | WO 00/78081 | * 12/2000 |
| WO | WO-03/049368 A2 | 6/2003 |
| WO | WO 2005076654 A1 | 8/2005 |

OTHER PUBLICATIONS

Malaysian Office Action, PI 20050417, Jun. 13, 2008, pp. 1-3, Malaysia.

*Primary Examiner* — Christopher Crutchfield
(74) *Attorney, Agent, or Firm* — Harrington & Smith

(57) ABSTRACT

An approach is provided for supporting end-to-end Quality of Service (QoS) control. A QoS profile identifier is generated that maps to a QoS parameter. The identifier is transmitted over the radio communication system to an end station, wherein the end station determines the QoS parameter based on the received identifier. The approach also provides an alert mechanism in which the end station transmits an alert message upon detecting a deviation from the QoS parameter.

26 Claims, 9 Drawing Sheets

(56) References Cited

U.S. PATENT DOCUMENTS

| | | | |
|---|---|---|---|
| 2005/0089043 A1* | 4/2005 | Seckin et al. | 370/395.21 |
| 2005/0111361 A1* | 5/2005 | Hosein | 370/230 |
| 2006/0159044 A1* | 7/2006 | Watanabe et al. | 370/328 |
| 2006/0218302 A1* | 9/2006 | Chia et al. | 709/245 |
| 2007/0291725 A1* | 12/2007 | Kowalski | 370/338 |

* cited by examiner

METHOD AND APPARATUS FOR PROVIDING END-TO-END QUALITY OF SERVICE (QOS)

RELATED APPLICATIONS

This application is related to, and claims the benefit of the earlier filing date under 35 U.S.C. §119(e) of, U.S. Provisional Patent Application (Ser. No. 60/541,514) filed Feb. 3, 2004, entitled "Methods and Apparatus of Air Link QoS Control for End-to-End QoS Support"; the entirety of which is incorporated herein by reference.

FIELD OF THE INVENTION

The present invention relates to communications, and more particularly, to providing Quality of Service (QoS) services.

BACKGROUND OF THE INVENTION

Radio communication systems, such as cellular systems, provide users with the convenience of mobility. This convenience has spawned significant adoption by consumers as an accepted mode of communication for business and personal uses. Cellular service providers, for example, have fueled this acceptance by developing more enhanced network services and applications. Because of the variety in the types of subscribers and their communication needs, service providers have concentrated on offering services that reflect differing levels of Quality of Service (QoS). For example, for personal use, a subscriber may be amenable to a lower QoS level (e.g., relatively higher delay, lower data rate, or lower availability) as trade off for lower fees. On the other hand, a business subscriber is likely to require a higher QoS level, as minimal delay, high speed and high availability are of primary import versus cost. Unfortunately, the developments in QoS support have varied greatly, resulting in inefficient use of network resources (stemming from higher overhead in implementing QoS services), among other concerns.

QoS support from one service provider's network to the next provider's system can be complex because of potential incompatibilities in their hardware and software platforms. This complexity is further magnified when QoS support is required from one end point to another end point. End-to-end QoS support poses additional challenges to service providers, as they have less control in deploying upgrades or changes to the end user terminals.

Therefore, there is a need for an approach for QoS control that minimizes use of network resources.

SUMMARY OF THE INVENTION

These and other needs are addressed by the present invention, in which an approach provides end-to-end quality of service (QoS) over a radio communication network.

According to one aspect of an embodiment of the present invention, a method for supporting quality of service (QoS) in a radio communication system is disclosed. The method includes receiving, at a first end station, a QoS profile identifier corresponding to a QoS parameter over the radio communication system. The method also includes determining the QoS parameter based on the received identifier, wherein the QoS parameter specifies a characteristic of a communication session established over the radio communication system between the first end station and a second end station.

According to one aspect of an embodiment of the present invention, an apparatus for supporting quality of service (QoS) in a radio communication system is disclosed. The apparatus includes a communication interface configured to receive a QoS profile identifier corresponding to a QoS parameter over the radio communication system. The apparatus also includes a processor configured to determine the QoS parameter based on the received identifier, wherein the QoS parameter specifies a characteristic of a communication session established over the radio communication system between the first end station and a second end station.

According to yet another aspect of an embodiment of the present invention, a method for supporting quality of service (QoS) in a radio communication system is disclosed. The method includes generating a QoS profile identifier that maps to a QoS parameter. Additionally, the method includes transmitting the identifier over the radio communication system to an end station, wherein the end station determines the QoS parameter based on the received identifier.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

An apparatus, method, and software for supporting end-to-end Quality of Service (QoS) signaling are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the present invention is discussed with respect to a radio communication system, it is recognized by one of ordinary skill in the art that the present invention has applicability to any type of transport network, including terrestrial systems.

Figure 1:
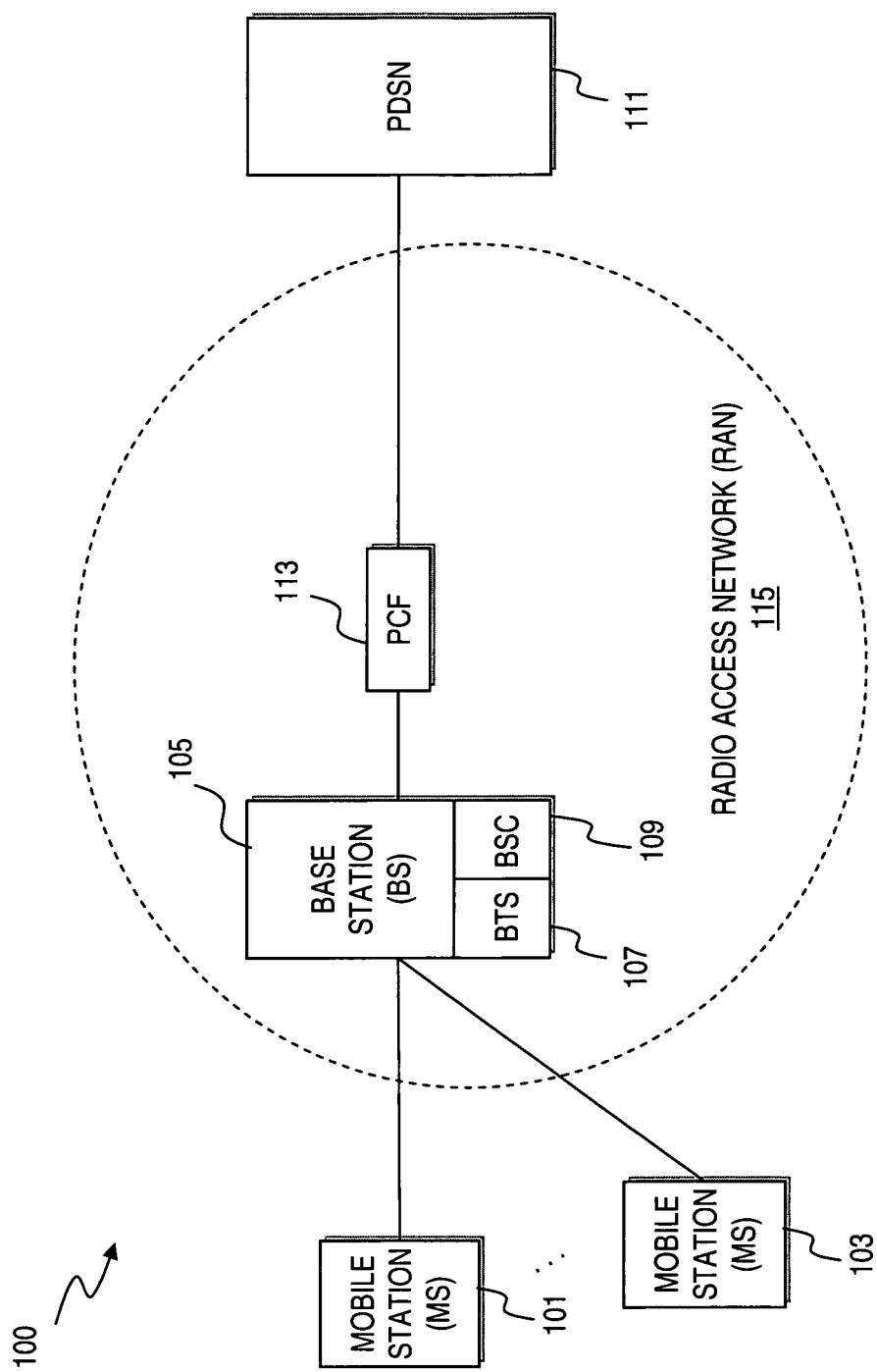
FIG. 1 is a diagram of a radio communication system capable of supporting an end-to-end Quality of Service (QoS), in accordance with an embodiment of the present invention.

FIG. 1 is a diagram of a radio communication system capable of supporting an end-to-end Quality of Service (QoS), in accordance with an embodiment of the present invention. A radio network 100 includes Mobile Stations (MS) 101, 103 in communication with a Base Station (BS) 105. According to one embodiment of the present invention, the radio network 100 supports Third Generation (3G) services as defined by the International Telecommunications Union (ITU) for International Mobile Telecommunications 2000 (IMT-2000). For the purposes of explanation, the end-to-end QoS capability of the radio network 100 is explained with respect to a cdma2000 architecture.

In this example, the base station 105 includes a Base Transceiver Station (BTS) 107 and Base Station Controller (BSC) 109. Although a single BTS 107 is shown, it is recognized that multiple BTSs are typically are connected to the BSC 109 through, for example, point-to-point links. The BS 105 is linked to a Packet Data Serving Node (PDSN) 111 through a Packet Control Function (PCF) 113. The PCF 113 is largely responsible for directing Point-to-Point Protocol (PPP) connection requests from the MS 101 to the PDSN 111. The BS 105, PCF 113, and PSDN 111 constitute the Radio Access Network (RAN) 115.

It is recognized that the QoS parameters need to be transmitted to an end station (e.g., MS 101 or MS 103) to ensure proper enforcement of these parameters. To convey QoS parameters in support of end-to-end service guarantees, the system 100, according to one embodiment of the present invention, utilizes a table that contains the QoS parameters, such that only table indices are exchanged over the radio link, as more fully described below in FIGS. 3 and 4.

Depending on the model used to establish the radio access bearer, the MS 101 or the PDSN 111 can map the QoS attributes for each data service instance from the QoS parameters. The two approaches are provided: a MS-centric approach, and a PDSN-centric approach. In the MS-centric approach, the MS 101 requests the required radio access QoS parameters it needs from the network 100 to support the application QoS. Under the PDSN-centric approach, the network 100 requests the radio access bearer after mapping the QoS parameters received from the MS 101 to the required radio access QoS parameters.

In contrast to the above approach, if the system 100 transmitted all the QoS parameters as a block of bits (BLOB), precious network capacity would have to be expended to transmit these QoS parameters over the radio link during the negotiation process. This entails wasting more network capacity than necessary. Also, another drawback is that the transmission of all the QoS parameters can be relatively slow, as the lengthy BLOB constrains the type of signaling protocol that can be employed.

The QoS approach of the system 100 advantageously permits a use of a QoS profile identifier, such as an index, to refer to a set of attributes, thereby avoiding a longer sized message containing a QoS BLOB. Because of the size reduction to transport these QoS parameters, Medium Access Control (MAC) protocol, Layer 3 (L3) signaling (Signaling Application) can be used to carry this identifier.

Figure 7:
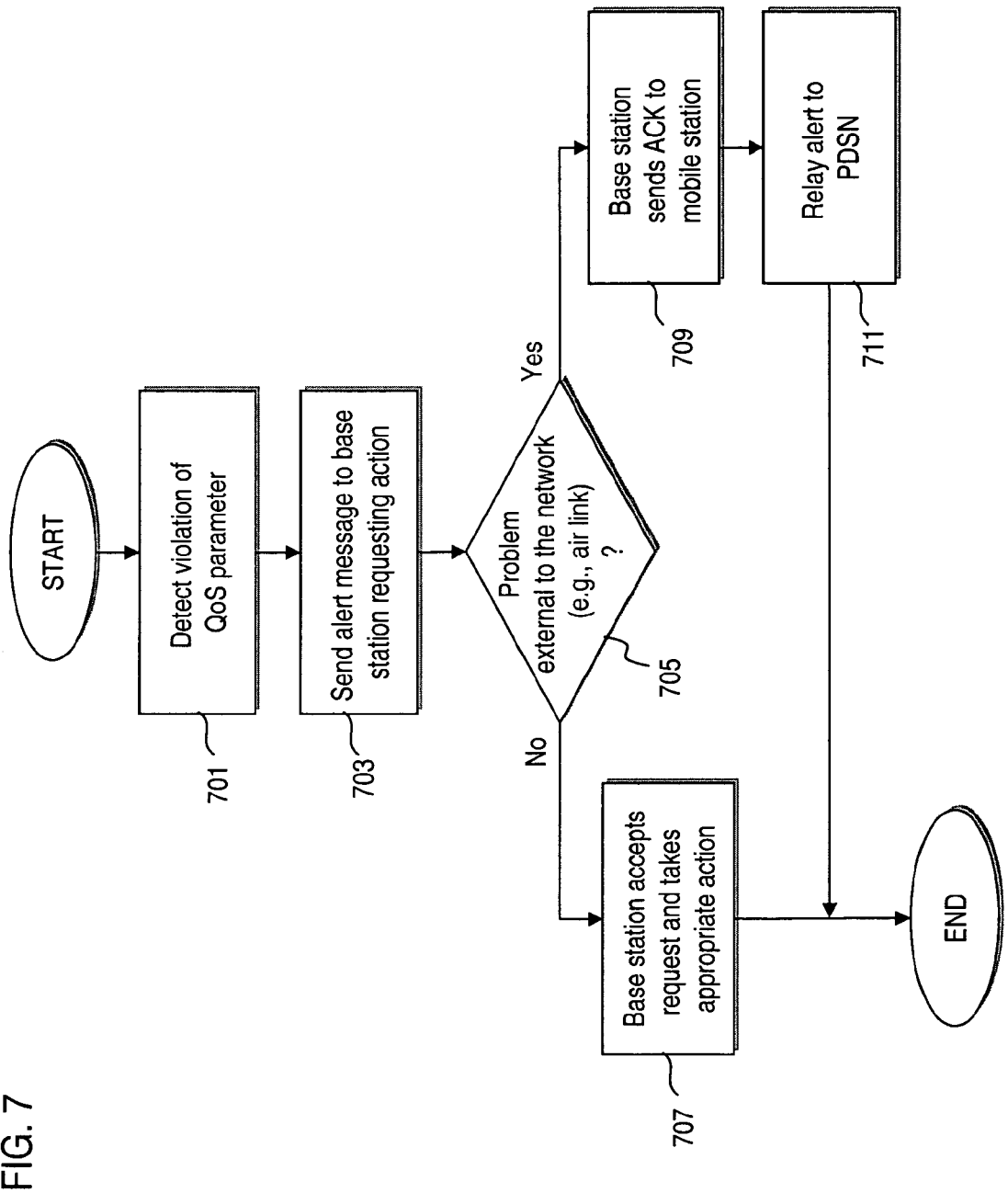
FIG. 7 is a flowchart of a process for providing alerts to support QoS enforcement, in accordance with an embodiment of the present invention.
Figure 8:
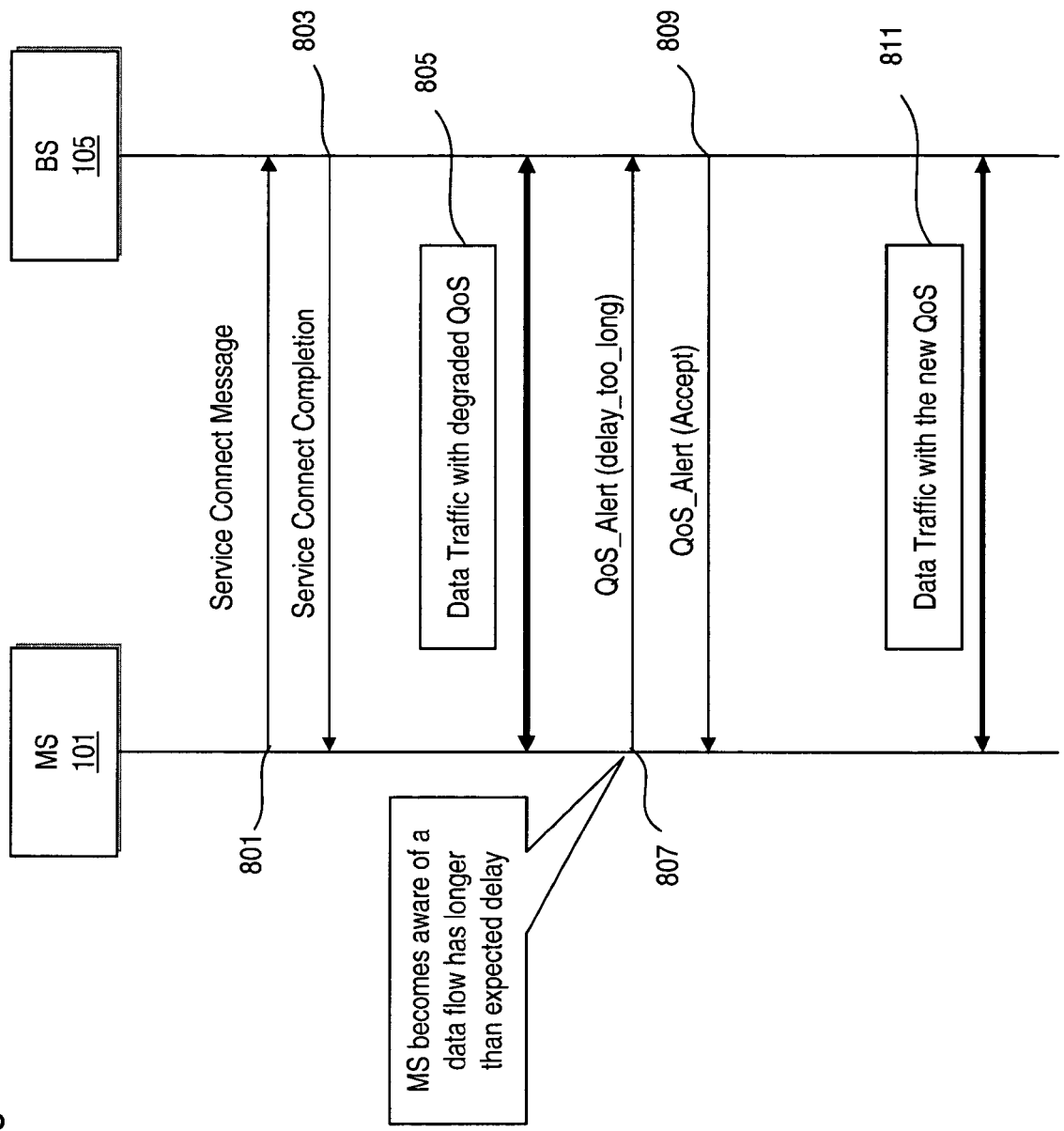
FIG. 8 is a diagram showing a message flow for QoS enforcement, in accordance with an embodiment of the present invention.

Unlike conventional systems in which enforcement QoS policy is problematic, the system 100 provides a QoS alert system for ensuring that the radio link satisfies negotiated QoS levels, as detailed with respect to FIGS. 7 and 8.

To better appreciate the present invention, it is instructive to describe an exemplary end-to-end QoS architecture used in the system 100 of FIG. 1.

Figure 2:
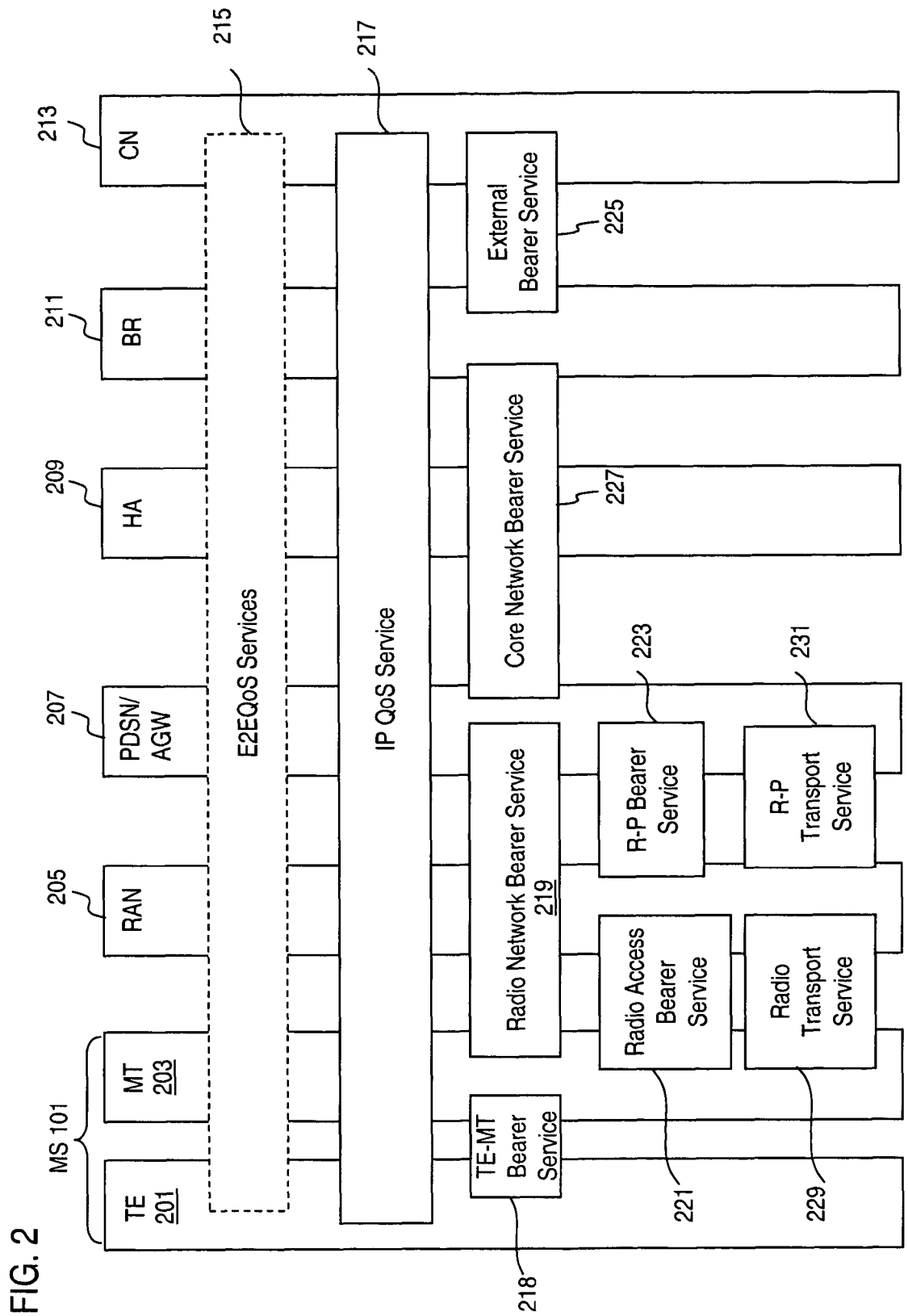
FIG. 2 is a diagram of a protocol architecture for providing end-to-end QoS, in accordance with an embodiment of the present invention.

FIG. 2 is a diagram of a protocol architecture for providing end-to-end QoS, in accordance with an embodiment of the present invention. In this model, the MS 101, 103, as mobile nodes, can be viewed as possessing two components: a Terminal Equipment (TE) 201 and a Mobile Terminal (MT) 203. As mentioned early, a Radio Access Network (RAN) 205 encompasses the part of the network from the MS 101 to the PDSN 207.

A PDSN/AGW (Access Gateway) 207, a Home Agent (HA) 209, and a Border Router (BR) 211 constitute a Core network, which may enforce the service level agreements between the MS 101 and a Corresponding Node (CN) 213. The CN 213 can reside in a peer network associated with a different administrative domain. Consequently, an end-to-end (E2E) QoS Service 215 can be defined as an application layer QoS between the end hosts (MS 101 and CN 213). The end-to-end QoS Service 215 can identify the QoS requirements, for example, via multi-media protocols, such as SIP/SDP (Session Initiation Protocol/Session Description Protocol).

The MT 203 may then establish a link layer connection suitable for support of the network layer session. The QoS parameters received from the application layer are mapped to the corresponding Internet Protocol (IP) layer signaling parameters as well as the link layer parameters—provided by the IP QoS Service 217. In particular, the IP QoS Service 217 can specify any number of Internet Engineering Task Force (IETF) QoS services, such as Integrated Services and Differentiated Services. A TE-MT Bearer Service 218 is provided between the TE 201 and the MT 203.

A Radio Network Bearer Service 219 is the bearer service between the MT 203 and the PDSN 207, and includes a Radio Access Bearer Service 221 and the R-P Bearer Service 223. The Radio Network Bearer Service 219 includes a translation function for converting between the Radio Bearer Service attributes and QoS attributes of the external networks service control protocol. The Radio Network Bearer Service 219 also provides an admission control function which maintains information about all available resources in the PDSN 207.

Further, the Radio Network Bearer Service 219 includes management functions in support of a negotiated QoS. Such management functions can include a classification/filtering function to classify data packets and a traffic conditioning function. The Radio Access Bearer Service 221 defines both the assured mode and non-assured mode (best effort) QoS parameters, and is further detailed in 3GPP2 C.S0017-0-2, entitled "Data Service Options for Spread Spectrum Systems," which incorporated herein by reference in its entirety.

The R-P Bearer Service 223 is defined between the RAN 205 and the PDSN 207. The R-P Bearer Service 223 has A8-A11 interfaces that can signal assured mode QoS attributes to the PDSN/AGW 207.

The External Bearer Service 225 is provided by an external network. The Core Network Bearer Service 227 of the Radio Network provides bearer service between the PDSN 207 and the BR 211.

The Radio Transport Service 229 is provided by a physical layer that is categorized by QoS traffic classes and attributes based on requirements of the physical radio channels such as FCH (Fundamental Channel), DCCH (Dedicated Control Channel), SCH (Supplemental Channel), etc. These channels are further defined in 3GPP2 C.S0001-C, entitled "Introduction to cdma2000 Standards for Spread Spectrum Systems," which is incorporated herein by reference in its entirety. The MAC/Multiplex sub-layer maps the radio bearer QoS attributes onto the physical channel QoS parameters. The radio transport layer service controls physical radio channel data units produced by the Radio Bearer Service 221.

The R-P Transport Service 231 is provided by a R-P transport network (which is typically a non-Diffserv network) to guarantee delivery of the R-P Bearer Service 223 within their specified QoS limits.

Figure 3:
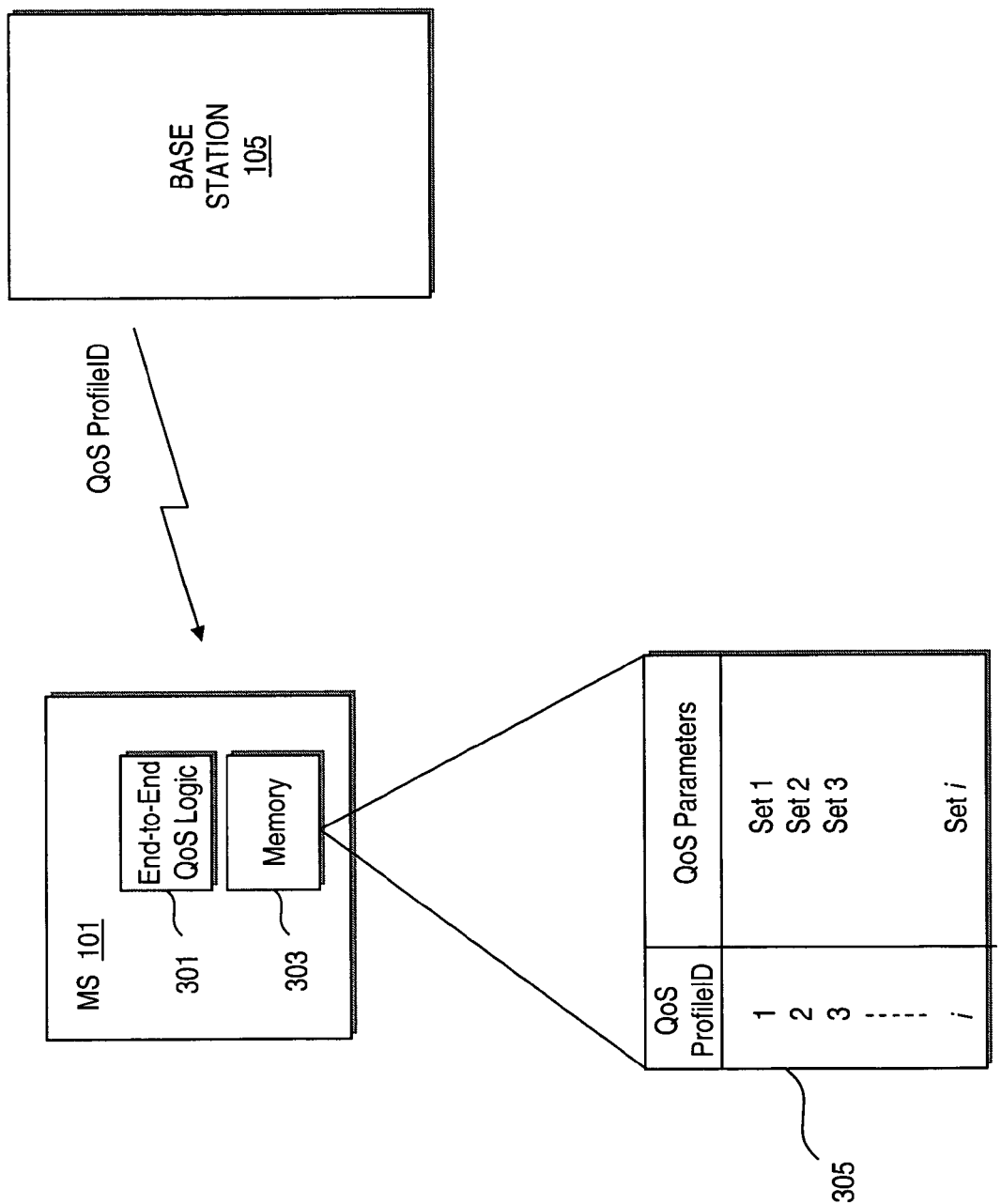
FIG. 3 is a diagram of a mobile station utilizing a QoS profile identifier to determine the QoS parameters, in accordance with an embodiment of the present invention.

FIG. 3 is a diagram of a mobile station utilizing a QoS profile identifier to determine the QoS parameters, in accordance with an embodiment of the present invention. In this example, the MS 101 includes an end-to-end QoS logic 301 for determining QoS parameters and executing processes to detect deviations from the QoS parameters. A memory 303 stores a QoS table 305, which can be pre-loaded in the memory 303 or can be downloaded during establishment of a communication session (e.g., call setup). The table 305 specifies sets of QoS parameter, as QoS profiles, with corresponding QoS profile indices. Under this arrangement, the base station 105 need only transmit a QoS profile identifier ("QoS ProfileID"), such as a table index value, over the radio link to specify an entire set of QoS parameters.

By way of example, the table 305 represent the QoS parameters of Table 1. Table 1 gives an example of the QoS table. It is recognized that due to the variations of the bandwidth requirements, the bandwidth (or data rate) requirement can be designated as a separate QoS attribute to minimize the table size.

TABLE 1

| QoS ProfileID | Relative Priority | Delay | Delay Variation | Information Loss |
|---|---|---|---|---|
| 1 | Priority 1 | <150 ms | <1 ms | <2% FER |
| 2 | Priority 1 | <250 ms | <1 ms | <2% FER |
| 3 | Priority 1 | <500 ms | <1 ms | <2% FER |
| 4 | Priority 1 | <750 ms | <1 sec | <3% FER |
| 5 | Priority 2 | <1 sec | <1 sec | <3% FER |
| 6 | Priority 2 | <4 sec | <2 sec | <3% FER |

As enumerated in Table 1, the exemplary set of QoS parameters can specify the following: a Relative Priority for indicating priority, Delay, Delay Variation, and Information Loss in terms of Error Rate (FER). The table 305 alternatively stores QoS parameters that can include anyone of the assured mode and non-assured mode (best effort) attributes. For example, QoS attributes defined for assured mode QoS include data rate, delay, jitter, error rate, priority, etc.

According to one embodiment of the present invention, some or all of the QoS attributes can be configured in advance of a request to enable a particular reservation. In this instance, the radio network 100, as an Access Network (AN) needs knowledge of the potential QoS attributes ("QoS Profiles") that the MS 101, as an Access Terminal (AT), may request. With this knowledge, the radio network 100 could setup some or all of the attributes that define the various MAC and application layer flows well in advance of the time that these reservations are requested and/or enabled. The Tables 2-4 illustrate parameters (QoS Profiles) that are downloaded into the mobile station 101 during the call setup.

TABLE 2

| Field | Length (bits) |
|---|---|
| Length | 8 |
| AttributeID | 16 |

The AttributeID field uniquely identifies the particular QoS attribute. Table 3 specifies the number of QoS Profiles that can be supported by the MS 101, per the QoSProfileCount field.

TABLE 3

| Field | Length (bits) |
|---|---|
| ValueID | 8 |
| QoSProfileCount | 8 |

The fields of Table 4 correspond to each QoS Profile. The ProfileType fields indicate the type of profile, and the length is specified by the ProfileLength field. Regarding the ProfileValue field, the sender sets this field, which has a length dependent on the profile length. The ProfileValue field can be omitted, if the Profile Type field is set to a predetermined value (e.g., 0x00).

TABLE 4

| Field | Length (bits) |
|---|---|
| ProfileType | 8 |
| ProfileLength | 8 |
| ProfileValue | ProfileLength × 8 |

Because the QoS Profile is known in advance, the MS 101 and the radio network 100 need not initiate negotiation of the QoS attribute. Exemplary QoS setup procedures involving the above message fields are illustrated in 3GPP2 X.S0011-D, entitled "cdma200 Wireless IP Network Standard: Quality of Service and Header Reduction," which is incorporated herein in its entirety.

In the event that the MS 101 develops a new QoS attribute that is not known by the radio network 100. The MS 101 can propose an enumeration of all supported types including the new attribute; and the radio network 100 would select the supported subset of those types during, for example, session configuration. This approach has the advantage of providing an enumeration of all of the mutually supported QoS Profile types so that the MS 101 need only select the QoS Profile types it knows the radio network 100 will support.

Figure 4:
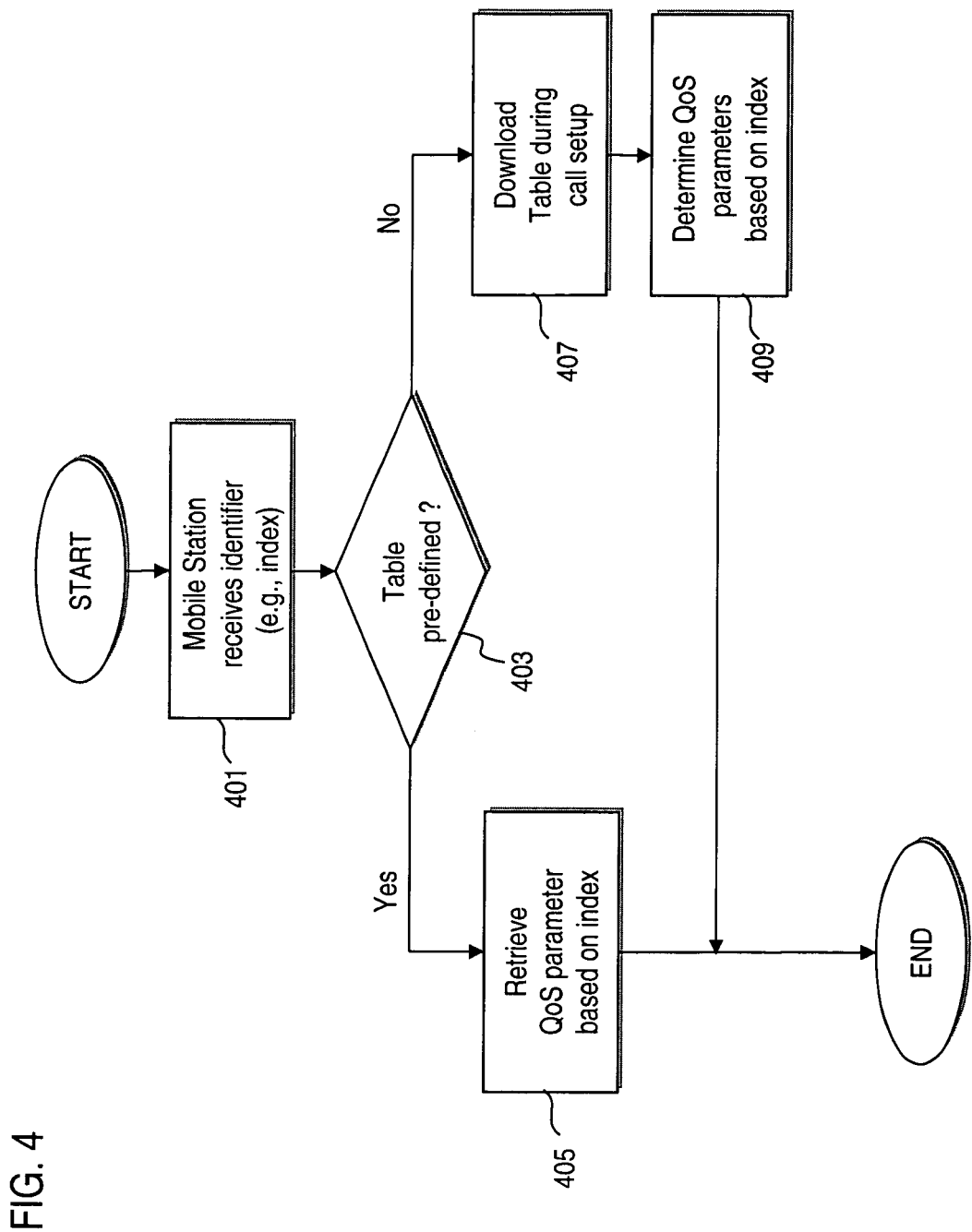
FIG. 4 is a flowchart of a process for obtaining a QoS table storing QoS parameters, according to an embodiment of the present invention.

FIG. 4 is a flowchart of a process for obtaining a QoS table storing QoS parameters, according to an embodiment of the present invention. As described, the MS 101 receives, as in step 401, a QoS profile identifier (e.g., table index) that corresponds to a set of QoS parameters. According to one embodiment of the present invention, the QoS table can be pre-defined according to a standard, such that the QoS parameters are pre-loaded or stored. If the table is pre-defined, as determined in step 403, the appropriate QoS parameters are retrieved based on the index (per step 405). In the alternative, the table can be downloaded, as in step 407, during establishment of a communication session (e.g., call setup). In step 409, the index is used to determine the corresponding set of QoS parameters.

Figure 5:
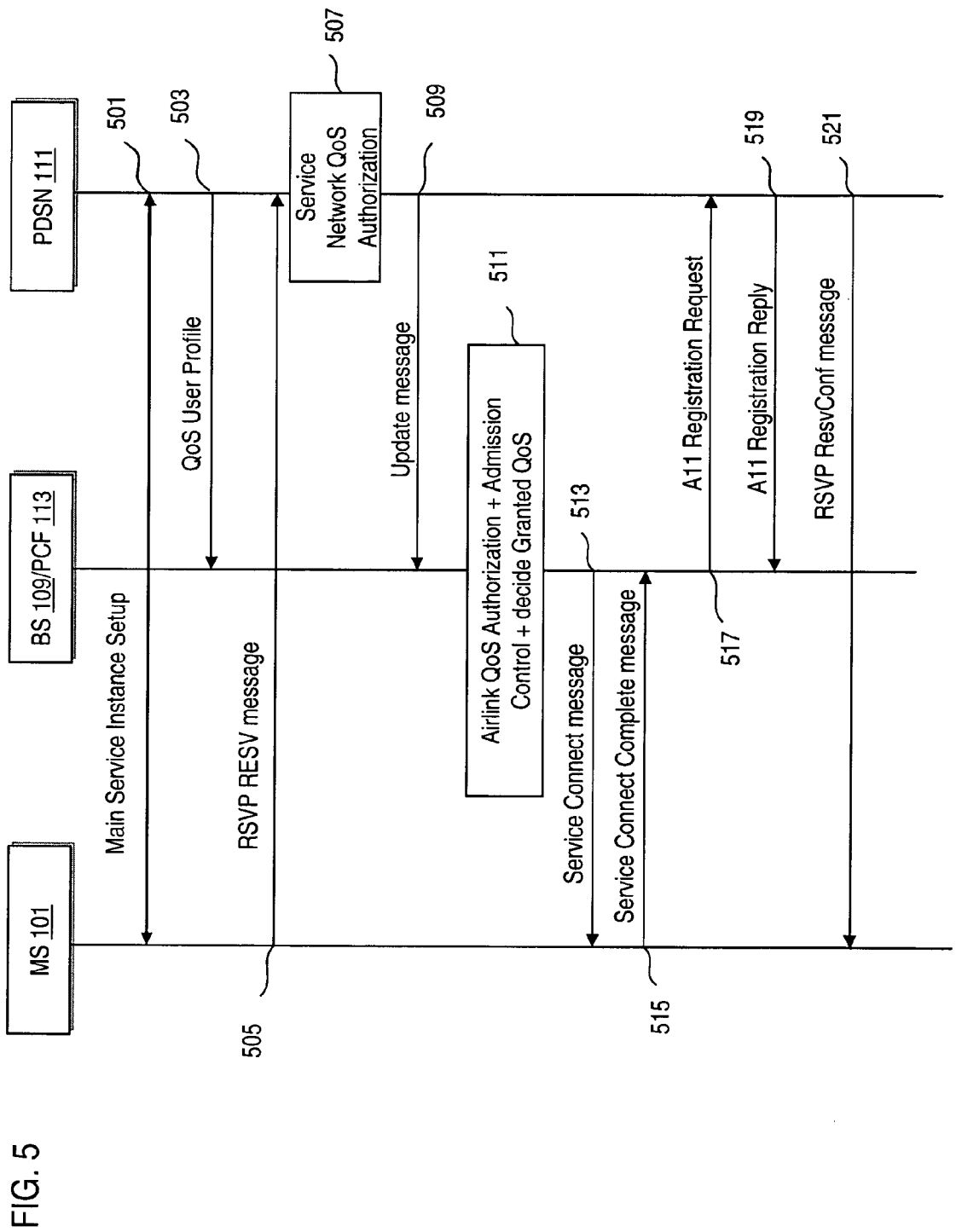
FIG. 5 is a diagram showing a Packet Data Serving Node (PDSN)-centric QoS setup procedure, in accordance with an embodiment of the present invention.

FIG. 5 is a diagram showing a Packet Data Serving Node (PDSN)-centric QoS setup procedure, in accordance with an embodiment of the present invention. For the purposes of illustration, the QoS setup procedure is described with respect to the QoS architecture of FIG. 2. A radio link is set up between the MS 101 and the PDSN 111 by an exchange of Service Connect and Service Connect Complete messages, as in step 501. Next, the PSDN 301, per step 503, sends a QoS User Profile request toward the BS/PCF 305.

In step 505, the MS 101 sends a Reservation Protocol (RSVP) reservation (RESV) request (Resv) message to the PDSN 111. At this point, the Service Network QoS is authorized (step 507). In step 509, an Update message is transmitted from the PDSN 111 to the BS 105/PCF 113, which grants the QoS after performing the necessary air link QoS authorization and admission control (step 511).

In step 513, the BS 105/PCF 113 sends a Service Connect message to the MS 101, which responds with a Service Connect Complete message (step 515). In turn, the BS 105/PCF 113 sends, as in step 517, an A11 Registration Request message to the PDSN 111. In step 519, the PDSN 111 responds with an A11 Registration Reply message. In step 521, a RSVP ResvConf message is communicated to the MS 101 by the PDSN 111.

Figure 6:
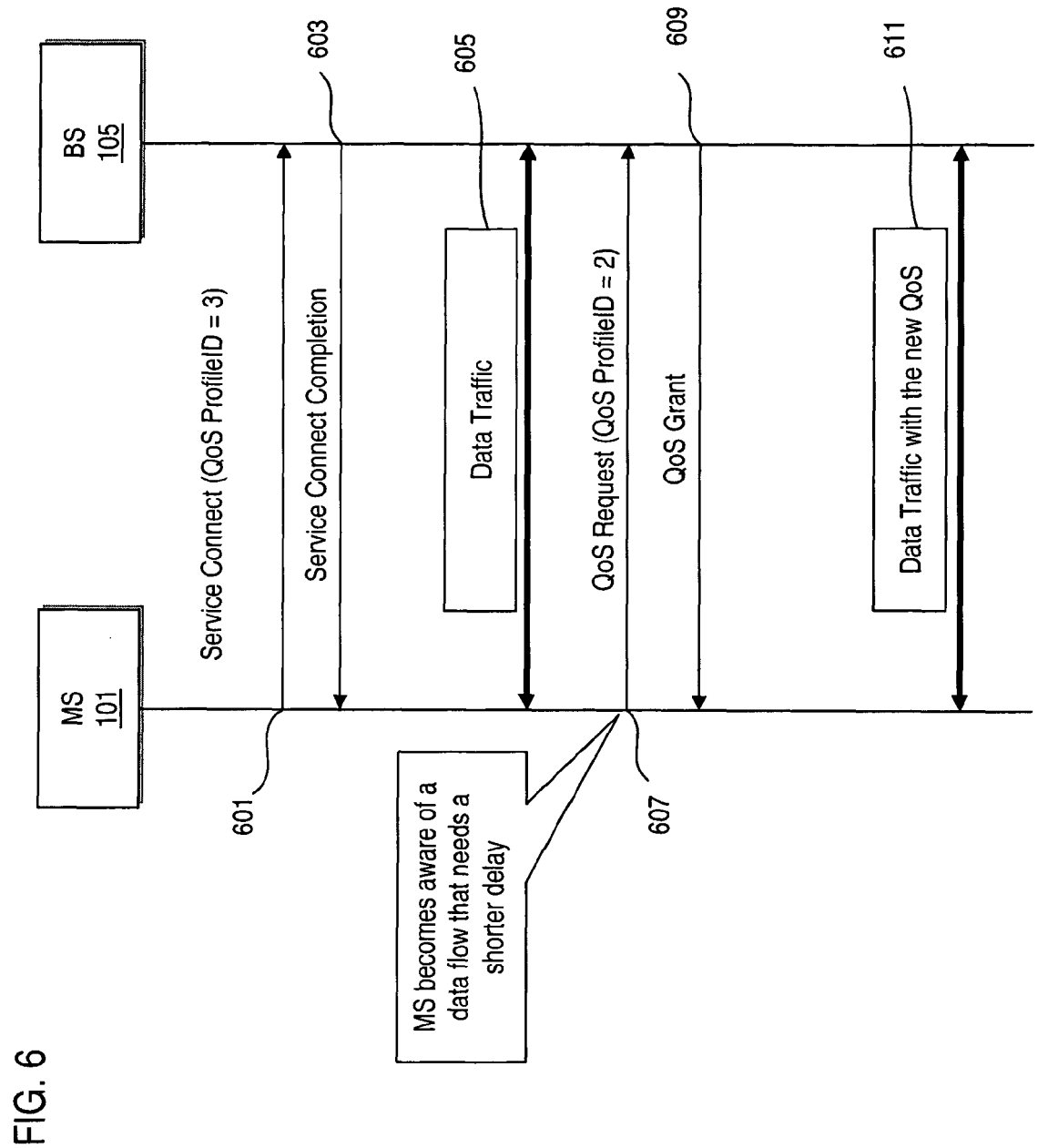
FIG. 6 is a diagram of a message flow for negotiating QoS parameters, in accordance with an embodiment of the present invention.

FIG. 6 is a diagram of a message flow for negotiating QoS parameters, in accordance with an embodiment of the present invention. In this exemplary scenario, during the data session, the MS 101 sends a request to adjust the delay requirement with submission of a different QoS ProfileID. In step 601, the MS 101 begins the QoS negotiations by sending a Service Connect message, which indicates a QoS ProfileID (e.g., QoS ProfileID of 3). The BS 105 responds with a Service Connect Completion message, and data traffic is exchanged between the MS 101 and the BS 105 (steps 603 and 605).

At this point, the MS 101 becomes aware that the data flow requires a shorter delay. Consequently, the MS 101 issues, per step 607, a QoS Request message specifying a different QoS ProfileID (that of 2). The BS 105 grants the request, as in step 609, with transmission of a QoS Grant message to the MS 101. Thereafter, data traffic is exchanged with the new QoS parameters (step 611).

The QoS signaling in the above process can be carried by MAC signaling or L3 signaling (Signaling Application). If both Forward and Reverse PDCH are assigned, R-REQCH (Reverse Request Channel) and F-GCH (Forward Grant Channel) can be used to carry out this signaling. Formats of the Reverse Request Message and Forward Grant Channel Message are illustrated as below in Tables 5 and 6. If only F-PDCH is assigned, then R-CQICH (Reverse Channel Quality Indication Channel) and F-PDCCH (Forward Packet Data Control Channel) can be modified for this signaling. If none of the PDCH is assigned then L3 signaling is used.

TABLE 5

| Field | Length (bits) |
| --- | --- |
| RESERVED | 1 |
| QoS_ProfileID | 6 |
| RESERVED2 | 4 |

The RESERVED and RESERVED2 are reserved fields. The QoS_ProfileID field indicates the requested QoS profile identifier associated with the QoS table.

TABLE 6

| Field | Length (bits) |
| --- | --- |
| MAC_ID | 8 |
| QoS_ProfileID | 6 |

The MAC_ID field is the MAC Identifier. By way of example, the base station 105 sets this field to the MAC identifier greater than or equal to "01000000" associated with the mobile station to which this QoS message is addressed. The QoS_ProfileID field indicates the QoS profile identifier.

The system 100 provides enforcement of the QoS policy through an alerting mechanism, as explained below.

FIG. 7 is a flowchart of a process for providing alerts to support QoS enforcement, in accordance with an embodiment of the present invention. Once data traffic is exchanged at a negotiated QoS level using the QoS ProfileID, the MS 101 can monitor the communication session for compliance with the QoS parameters. In this example, the MS 101 detects violation of the QoS parameter, per step 701. This detection, in an exemplary embodiment, can be based on thresholds. For example, the triggers for MS 101 to initiate QoS enforcement request may include determining that following: the forward link data rate is below a threshold, the delay is above a threshold, the jitter is above a threshold, or the error rate above threshold. The thresholds for triggering an alert can be loaded from the base station 105 or determined by the mobile station 101 based on application type.

The BS 105 can respond to the triggers with one of the following messages: an ACCEPT message to indicate acceptance of the request and that appropriate action will be taken to enforce the QoS; a REJECT message to indicate that the request cannot be processed due to, for instance, the current system load; and an ACK message to indicate that the trigger is received and is to be relayed to another network element (or node), which may be external to the radio network 100.

Accordingly, the MS 101 sends an alert message, as in step 703, to the base station 105, requesting appropriate action to correct the problem. In step 705, the base station 105 determines that the problem is external to the radio (or air link) of the system 100. If the problem stems from a source internal to the system 100, the base station 101 accepts the request and takes appropriate action to bring the QoS parameter back into compliance, per step 707. However, if the problem is not external, the base station 105 acknowledges the request from the MS 101 with an ACK message, per step 709. Because the problem is external to the system 100, the base station 105 relays, as in step 711, the alert message to the PDSN 111 to resolve the issue or to further forward the message to a proper entity or node for resolution.

FIG. 8 is a diagram showing a message flow for QoS enforcement, in accordance with an embodiment of the present invention. Per steps 801 and 803, a radio link is established between the MS 101 and the BS 105 through an exchange of Service Connect and Service Connection Completion messages. In step 805, data is sent from the MS 101 to the BS 105, but with degraded quality of service. One of the QoS attributes is below is respective threshold. The MS 101 in particular becomes aware that the data flow has a longer than expected delay (based on the QoS parameters). For example, whenever the QoS parameter (i.e., Delay) falls below a delay threshold value, this condition triggers the alert.

Consequently, in step 807, the MS 101 sends a QoS Alert message that indicates the delay is too long. In response to this message, the BS 105 accepts the request, per step 809. Thus, the MS 101, as in step 811, can now transmit data with the new QoS parameter.

It is contemplated that L3 signaling (Signaling Application) or MAC signaling can be used for this QoS Alert. If R-PDCH is assigned, R-REQCH and F-GCH can be used to carry the alert as MAC signaling. If only F-PDCH is assigned then R-CQICH and F-PDCCH can be used to carry the MAC signaling.

The processes described above provide an end-to-end QoS scheme in which a QoS ProfileID is used to specify QoS parameters, and a QoS alert mechanism to enforce the QoS policy. The processes detailed above can be executed through a variety of hardware and/or software configurations.

Figure 9:
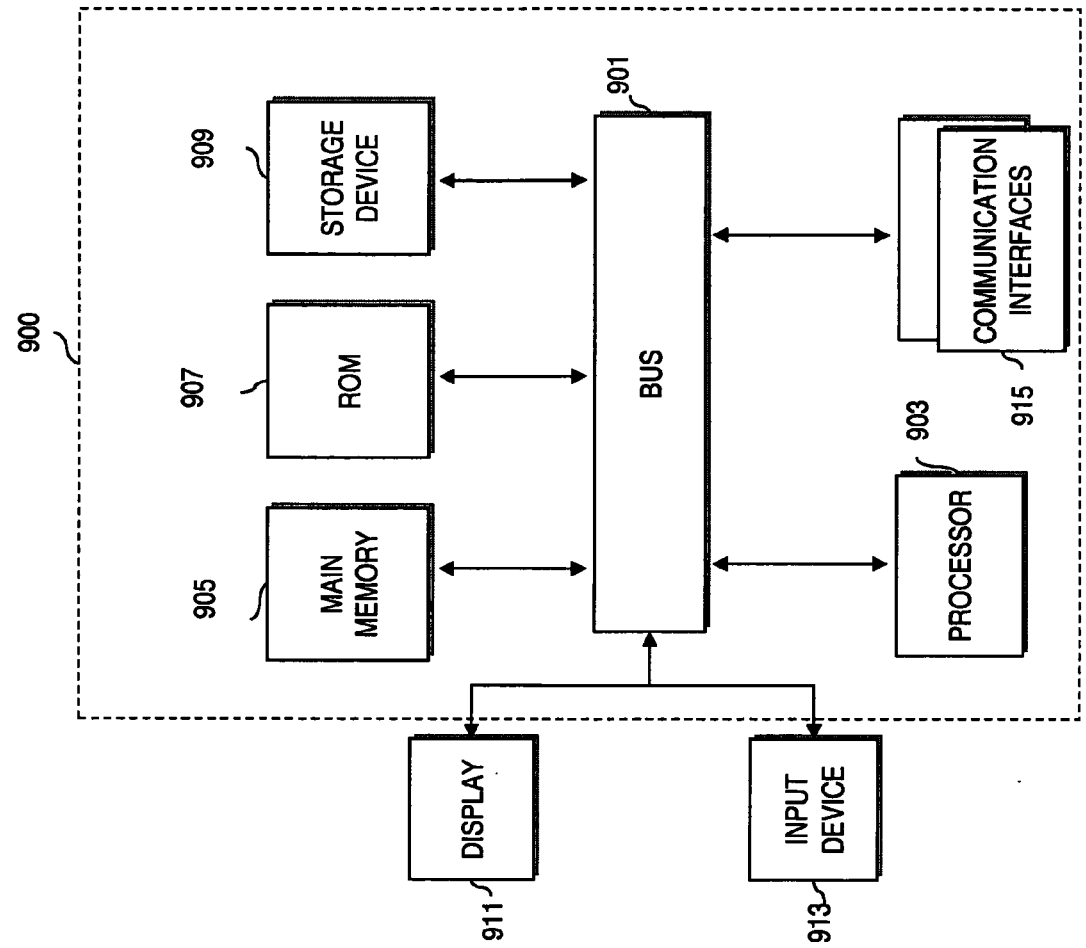
FIG. 9 is a diagram of hardware that can be used to implement an embodiment of the present invention.

FIG. 9 illustrates exemplary hardware upon which an embodiment according to the present invention can be implemented. A computing system 900 includes a bus 901 or other communication mechanism for communicating information and a processor 903 coupled to the bus 901 for processing information. The computing system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computing system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computing system 900 may be coupled via the bus 901 to a display 911, such as a liquid crystal display, or active matrix display, for displaying information to a user. An input device 913, such as a keyboard including alphanumeric and other keys, may be coupled to the bus 901 for communicating information and command selections to the processor 903. The input device 913 can include a cursor control, such as a mouse, a trackball, or cursor direction keys, for communicating direction information and command selections to the processor 903 and for controlling cursor movement on the display 911.

According to one embodiment of the invention, the processes of FIGS. 4-8 can be provided by the computing system 900 in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the embodiment of the present invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the present invention are not limited to any specific combination of hardware circuitry and software.

The computing system 900 also includes at least one communication interface 915 coupled to bus 901. The communication interface 915 provides a two-way data communication coupling to a network link (not shown). The communication interface 915 sends and receives electrical, electromagnetic, or optical signals that carry digital data streams representing various types of information. Further, the communication interface 915 can include peripheral interface devices, such as a Universal Serial Bus (USB) interface, a PCMCIA (Personal Computer Memory Card International Association) interface, etc.

The processor 903 may execute the transmitted code while being received and/or store the code in the storage device 909, or other non-volatile storage for later execution. In this manner, the computing system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the present invention has been described in connection with a number of embodiments and implementations, the present invention is not so limited but covers various obvious modifications and equivalent arrangements, which fall within the purview of the appended claims.

What is claimed is:

1. A method comprising:

receiving a quality of service profile identifier corresponding to a first set of one or more quality of service parameters for service over a radio communication system, wherein the quality of service profile identifier is a specific one of a fixed plurality of possible quality of service profile identifiers, each of which is an index into a table containing a fixed plurality of sets of quality of service parameters and selects one of the sets of quality of service parameters;

determining the first set of one or more quality of service parameters based on the received identifier by using the received identifier as an index into the table to select the first set from the sets in the table, wherein the one or more quality of service parameters from the first set specify one or more characteristics of a communication session for the service established over the radio communication system and map to one or more quality of service parameters for a radio bearer established for the communication session;

negotiating quality of service, in the communication session, comprising:
  sending and receiving data traffic using the radio bearer according to the one or more quality of service parameters for the first set;
  retrieving a quality of service profile identifier corresponding to one or more new quality of service parameters;
  transmitting a request including the new quality of service profile identifier;
  receiving a response which indicates an allowed quality of service profile identifier;
using the received allowed quality of service identifier as an index into the table to select a second set of one or more quality of service parameters from the sets in the table; and
sending and receiving data traffic according to the second set of the one or more quality of service parameters retrieved from the table based on the allowed quality of service identifier.

2. A method according to claim 1, wherein the quality of service parameters are air interface parameters that comprise one or more of data rate, priority, delay, delay variation, jitter, or error rate.

3. A method according to claim 2, further comprising:
  during establishment of the communication session, receiving the table.

4. A method according to claim 1, further comprising:
  receiving the quality of service profile identifier over the radio communication system according to a signaling protocol that includes one of Layer 3 Signaling or a Medium Access Control (MAC) protocol.

5. A method according to claim 1, wherein the radio communication system is a cellular system.

6. A method according to claim 1, further comprising transmitting an alert message to notify a base station within the radio communication system of a deviation associated with at least a forward link of the radio communication system, wherein the alert message includes a request to enforce the one or more quality of service parameters based on the identifier.

7. The method of claim 1, wherein the table is pre-defined prior to the establishment of the communication session and prior to receiving the quality of service profile identifier.

8. The method of claim 1, wherein receiving the quality of service profile identifier corresponding to the first set of one or more quality of service parameters further comprises receiving the quality of service profile identifier without receiving corresponding quality of service parameters.

9. A non-transitory computer-readable storage medium carrying instructions which, when executed by one or more processors, cause an apparatus to at least perform the following steps:

receiving a quality of service profile identifier corresponding to a first set of one or more quality of service parameters for service over a radio communication system, wherein the quality of service profile identifier is a specific one of a fixed plurality of possible quality of service profile identifiers, each of which is an index into a table containing a fixed plurality of sets of quality of service parameters and selects one of the sets of quality of service parameters;

determining the first set of one or more quality of service parameters based on the received identifier by using the received identifier as an index into the table to select the first set from the sets in the table, wherein the one or more quality of service parameters from the first set specify one or more characteristics of a communication session for the service established over the radio communication system and map to one or more quality of service parameters for a radio bearer established for the communication session;

negotiating quality of service, in the communication session, including comprising:
  sending and receiving data traffic using the radio bearer according to the one or more quality of service parameters for the first set;
  retrieving a quality of service profile identifier corresponding to one or more new quality of service parameters from another set in the table;
  transmitting a request including the new quality of service profile identifier;
  receiving a response which indicates an allowed quality of service profile parameter;
using the received allowed quality of service identifier as an index into the table to select a second set of one or more quality of service parameters from the sets in the table; and
sending and receiving data traffic according to the second set of the one or more quality of service parameters retrieved from the table based on the allowed quality of service profile identifier.

10. An apparatus comprising:
at least one processor; and
a memory including instructions,
the memory and the instructions configured to, with the at least one processor, cause the apparatus to perform at least the following,
receive a quality of service profile identifier corresponding to a first set of one or more quality of service parameters for service over a radio communication system, wherein the selected quality of service profile identifier is a specific one of a fixed plurality of possible quality of service profile identifiers, each of which is an index into a table containing a fixed plurality of sets of quality of service parameters and selects one of the sets of quality of service parameters;

determine the first set of one or more quality of service parameters based on the received identifier by using the received identifier as an index into the table to select the first set from the sets in the table, wherein the one or more quality of service parameters from the first set specify one or more characteristics of a communication session for the service established over the radio communication system and map to one or more quality of service parameters for a radio bearer established for the communication session;

negotiating quality of service, in the communication session, comprising:

sending and receiving data traffic using the radio bearer according to the one or more quality of service parameters from the first set;
retrieving a quality of service profile identifier corresponding to one or more new quality of service parameters;
transmitting a request including the new quality of service profile identifier;
receiving a response which indicates an allowed quality of service profile identifier;
using the received allowed quality of service identifier as an index into the table to select a second set of one or more quality of service parameters from the sets in the table; and
sending and receiving data traffic according to the second set of the one or more quality of service parameters retrieved from the table based on the allowed quality of service identifier.

11. An apparatus according to claim 10, wherein the quality of service parameters are air interface parameters that comprise one or more of data rate, priority, delay, delay variation, jitter, or error rate.

12. An apparatus according to claim 11, wherein the memory and the instructions are further configured to, with the at least one processor, cause the apparatus to perform at least the following:
determine to store the table, the table being received during establishment of the communication session.

13. An apparatus according to claim 10, wherein the memory and the instructions are further configured to, with the at least one processor, cause the apparatus to perform at least the following:
receive the quality of service profile identifier over the radio communication system according to a signaling protocol that includes one of Layer 3 Signaling or a Medium Access Control (MAC) protocol.

14. An apparatus according to claim 10, wherein the radio communication system is a cellular system.

15. The apparatus of claim 10, wherein the table is predefined prior to the establishment of the communication session and prior to receiving the quality of service profile identifier.

16. The apparatus of claim 10, wherein receiving the quality of service profile identifier corresponding to the first set of one or more quality of service parameters further comprises receiving the quality of service profile identifier without receiving corresponding quality of service parameters.

17. A method comprising:
selecting a quality of service quality of service profile identifier that maps to a first set of one or more quality of service parameters that specify one or more characteristics in a communication session of service established in a radio communication system, wherein the one or more quality of service parameters for the service map to one or more quality of service parameters for a radio bearer established for the communication session, and wherein the quality of service profile identifier is a specific one of a fixed plurality of possible quality of service profile identifiers, each of which is an index into a table containing a fixed plurality of sets of quality of service parameters and selects one of the sets of quality of service parameters;
sending the selected quality of service profile identifier to a mobile station;
negotiating quality of service, in the communication session, including:
sending and receiving data traffic using the radio bearer according to the one or more quality of service parameters for the first set;
receiving a request including a new quality of service profile identifier;
transmitting a response which indicates an allowed quality of service profile identifier,
using the transmitted allowed quality of service identifier as an index into the table to select a second set of one or more quality of service parameters from the sets in the table; and
sending and receiving data traffic according to the second set of the one or more quality of service parameters retrieved from the table based on the allowed quality of service profile identifier.

18. A method according to claim 17, wherein the quality of service parameters are air interface parameters that comprise one or more of data rate, priority, delay, delay variation, jitter, or error rate.

19. A method according to claim 18, further comprising:
during establishment of the communication session, transmitting the table.

20. A method according to claim 17, further comprising:
transmitting the quality of service identifier over the radio communication system according to a signaling protocol that includes one of Layer 3 Signaling or a Medium Access Control (MAC) protocol.

21. A method according to claim 17, wherein the radio communication system is a cellular system.

22. A method according to claim 17, further comprising receiving an alert message performing a notification of a deviation associated with at least a forward link of the radio communication system, wherein the alert message includes a request to enforce the one or more quality of service parameters based on the identifier, the method further comprising:
if the deviation can be corrected internally, determining to accept the request; and
determining to take appropriate action to bring quality of service parameters back into compliance.

23. The method of claim 17, wherein the table is predefined prior to the establishment of the communication session and prior to selecting the quality of service profile identifier.

24. The method of claim 17, wherein sending the selected quality of service profile identifier further comprises sending the quality of service profile identifier without sending corresponding quality of service parameters.

25. A non-transitory computer-readable storage medium carrying instructions which, when executed by one or more processors, cause an apparatus to at least perform the following steps:
selecting a quality of service profile identifier that maps to a first set of one or more quality of service parameters that specify one or more characteristics in a communication session of service established in a radio communication system, wherein the one or more quality of service parameters for the service map to one or more quality of service parameters for a radio bearer established for the communication session, and wherein the selected quality of service profile identifier is a specific one of a fixed plurality of possible quality of service profile identifiers, each of which is an index into a table containing fixed plurality of sets of quality of service parameters and selects one of the sets of quality of service parameters;
sending the selected quality of service profile identifier to a mobile station;

negotiating quality of service, in the communication session, comprising:
sending and receiving data traffic using the radio bearer according to the one or more quality of service parameters for the first set;
receiving a request including a new quality of service profile identifier;
transmitting a response which indicates an allowed quality of service profile identifier;
using the transmitted allowed quality of service identifier as an index into the table to select a second set of one or more quality of service parameters from the sets in the table; and
sending and receiving data traffic according to the second set of the one or more quality of service parameters retrieved from the table based on the allowed quality of service profile identifier.

26. A method comprising:
receiving, at a first end station, a quality of service profile identifier corresponding to a quality of service profile of a plurality of quality of service parameters over a radio communication system;
determining the quality of service parameters from a table storing the quality of service profile identifier and the quality of service parameters using the received identifier, wherein the quality of service parameters specify one or more characteristics of one data flow in a communication session established over the radio communication system between the first end station and a second end station, and wherein at least one of the quality of service parameters is configured in advance of a request to enable a particular reservation;
detecting a deviation from the quality of service parameters associated with at least a forward link of the radio communication system;
determining to transmit an alert message to notify a base station within the radio communication system of the deviation associated with at least a forward link of the radio communication system;
determining to transmit a set of one or more quality of service attributes supported by the first end station; and
receiving a subset of one or more quality of service attributes selected from the set of one or more quality of service attributes.

* * * * *

UNITED STATES PATENT AND TRADEMARK OFFICE
CERTIFICATE OF CORRECTION

| | | |
|---|---|---|
| PATENT NO. | : 9,065,739 B2 | Page 1 of 1 |
| APPLICATION NO. | : 11/044892 | |
| DATED | : June 23, 2015 | |
| INVENTOR(S) | : Mark W. Cheng and Liangchi Hsu | |

It is certified that error appears in the above-identified patent and that said Letters Patent is hereby corrected as shown below:

Claims

In Claim 9:
Column 12, line 21, "including" should be deleted.

In Claim 18:
Column 14, line 16, "the" should be deleted.

Signed and Sealed this
Twenty-fourth Day of November, 2015

Michelle K. Lee
*Director of the United States Patent and Trademark Office*

UNITED STATES PATENT AND TRADEMARK OFFICE
CERTIFICATE OF CORRECTION

Page 1 of 1

PATENT NO. : 9,065,739 B2
APPLICATION NO. : 11/044892
DATED : June 23, 2015
INVENTOR(S) : Mark W. Cheng and Liangchi Hsu It is certified that error appears in the above-identified patent and that said Letters Patent is hereby corrected as shown below:

Claims

In Claim 17:

Column 13, line 50, delete "quality of service". (1st occurrence)

Signed and Sealed this
Fifth Day of January, 2016

Michelle K. Lee
*Director of the United States Patent and Trademark Office*